W. H. PARK.
PASTEURIZING APPARATUS.
APPLICATION FILED JULY 6, 1910.
1,062,847.
Patented May 27, 1913.
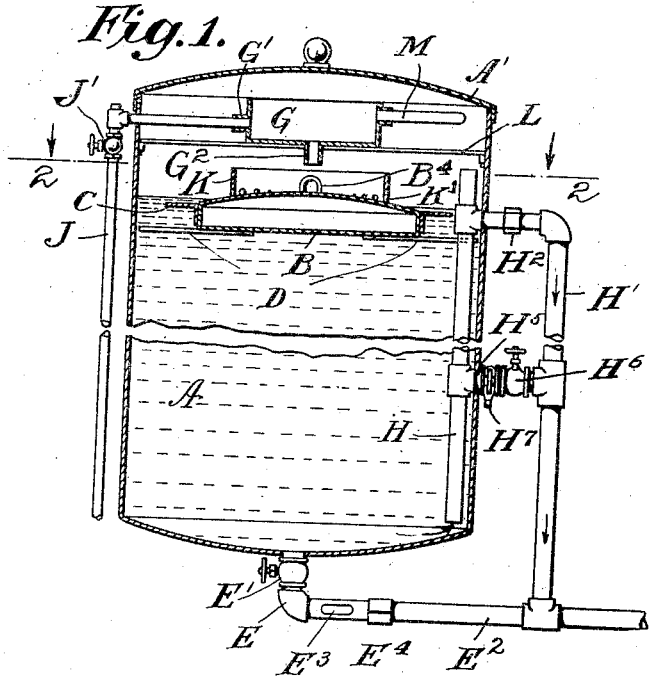
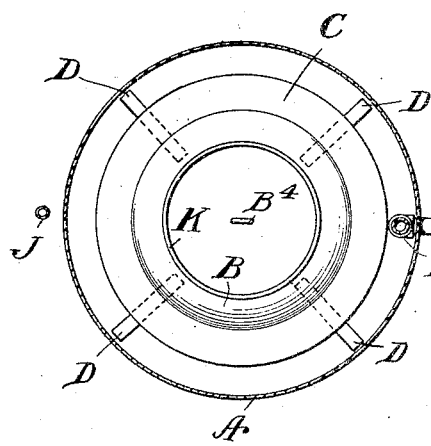
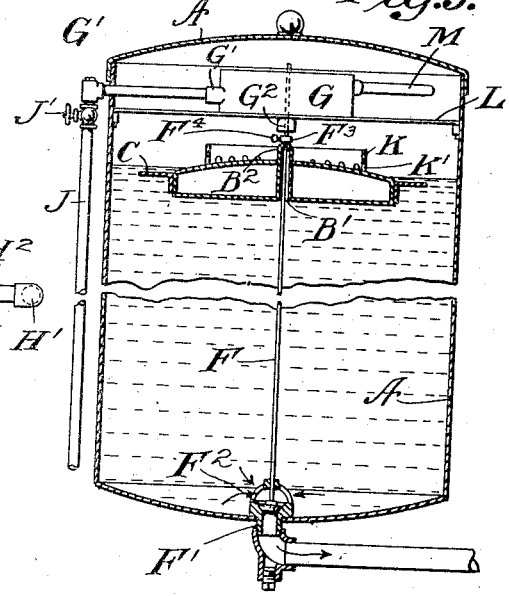
Attest:
Inventor:
William H. Park
by _____, Att'y

UNITED STATES PATENT OFFICE.

WILLIAM H. PARK, OF NEW YORK, N. Y.

PASTEURIZING APPARATUS.

1,062,847.  Specification of Letters Patent.  Patented May 27, 1913.

Application filed July 6, 1910. Serial No. 570,688.

*To all whom it may concern:*

Be it known that I, WILLIAM H. PARK, a citizen of the United States, and a resident of the borough of Manhattan, in the county of New York, city and State of New York, have invented certain new and useful Improvements in Pasteurizing Apparatus, of which the following is a specification.

The invention relates to apparatus designed to be used in the pasteurization of milk or other liquids, and its objects are to provide a safe, reliable and effective apparatus of this character of simple, inexpensive and durable construction, the parts of which may be easily constructed and which may be effectively and reliably operated by persons of ordinary intelligence, and without the necessity for constant care and attention.

To these ends the invention consists in the construction, combination and arrangement of parts hereinafter described and claimed and illustrated in the accompanying drawings.

In the said drawings Figure 1 is a vertical cross-section of an apparatus embodying the improvements. Fig. 2 is a horizontal cross-section on the line 2—2 of Fig. 1 looking in the direction indicated by the arrow. Fig. 3 is a view similar to Fig. 1 of a modified form.

The apparatus is primarily designed to be used in connection with the pasteurization of milk—although it may be used for the similar treatment of other liquids—and will be described with reference to its said primary use.

It will be understood by those familiar with the pasteurization of milk that it is desirable to have the temperature of the milk raised to a certain predetermined point—say 150 degrees—and to maintain it at or about this point for a considerable period, and that an apparatus designed to be used for the purpose of pasteurizing milk must, in order to meet all the requirements, be provided with means whereby the milk after being raised to the desired temperature is permitted to remain at that temperature for the required length of time and prevented from being withdrawn for use before that period has elapsed. It is for the purpose of insuring the proper performance of these requirements automatically and without the possibility of accidental or intentional interference therewith that the apparatus which forms the subject matter of this application is principally designed.

In the apparatus illustrated in the drawings, the milk, after being heated to the desired temperature, is caused to pass into the cylindrical holder A through the pipe J which enters through the wall of the said holder below the cover A' and has its discharge end connected with the pan G by means of a collar G' in the side of said pan which receives it. The principal object of having the milk received by the pan G on entering the holder is to prevent an oversupply and to avoid undue pressure on the spreader by the entering stream. The pan may be observed by removing the cover, or the cover may be made of transparent material, or entirely omitted in order that the depth of the milk therein may be ascertained.

From the pan G the milk passes, through the depending outlet tube $G^2$ down to the float B, which in the usual operative condition of the apparatus is immediately below the said tube, since the level of milk in the holder must be such as to raise it to this point before there can be any discharge.

When the holder is first filled the float rises from the bottom as the level of liquid rises, and in this operation the annular flange K concentrically arranged with respect to the float on the upper surface of said float receives the milk discharged from the tube $G^2$ and checks its tendency to splash against the sides of the holder by causing a pool to be formed. Small openings K' are located at intervals along the lower edge of the flange K for the purpose of permitting all of the liquid therein to flow out.

The float is provided with a plurality of spacers D extending radially therefrom and preferably located 90 degrees apart, so as to space the said float from the walls of the holder and maintain its position in the center thereof. An annular horizontal flange or rim C is also provided at the outer edge of the upper surface of the float, and extends approximately half the distance from the said outer edge to the walls of the holder. The object and purpose of this flange is to give the milk flowing from the medial part of the convex upper surface of the float a horizontal direction and provide a surface in addition to the upper surface of the float upon which it may spread and by which it will be caused to enter the body of milk in a thin, slowly flowing body. It will be observed that this flange C is so formed and placed as to be normally slightly submerged, and the object of this provision is to still further check the outward flow of the milk before it reaches the liquid body in the holder. By these means the milk is received and caused to spread out gently upon the upper surface of the liquid body in the holder, without receiving any material vertical movement either through its initial movement on entering the holder or through contact with the walls or other parts thereof. The result is that the milk entering the holder remains on the top of the liquid body and as it cools, and its specific gravity is thereby increased, settles toward the bottom, fresh and warmer milk flowing in above it constantly. It is, therefore, only necessary to gage the flow of milk into the holder so that it will fill and empty once in each half hour—or other predetermined time—in order to insure that each particle entering the holder shall remain therein substantially throughout the full period and be discharged therefrom only after it has been subjected to the desired temperature for the proper period of time. It will be observed that in the construction and operation of this device the variation in the specific gravity of the liquid due to slight differences in temperature is utilized to secure the gradual passage of each drop through the holder, and that in the apparatus this action is inaugurated by the deposition of the freshly heated milk in such a manner that because of its inferior specific gravity it will spread out over the top of the liquid body.

The supply pipe J is provided with a valve J' by which the flow of milk to the holder may be regulated so as to provide for the filling and emptying thereof at a rate that will insure proper pasteurization. By making the depending outlet tube of the receptacle G of the proper size and capacity, however, this result may be accomplished without the use of a valve, and in this case a more rapid flow of milk than is desired cannot be caused.

In the construction shown in Fig. 1, the outlet is through the pipe H leading from the bottom of the holder to a point near the top thereof, and provided with a branch pipe H' extending through the wall of the holder and adapted to be used for the filling of any suitable receptacle. In order that all siphoning action of this pipe may be avoided, its upper end extends above the outlet level and is open. It will be seen that when the liquid rises to the level of the branch pipe H', it will begin to flow out from the bottom of the holder through this pipe and will continue to flow out as long as milk is supplied to the holder. When the supply ceases, the milk remaining in the holder may be siphoned out by stopping the upper end of the pipe H or discharged through the outlet E in the extreme bottom of the holder, which is ordinarily closed by the valve E'. This outlet is also useful in the operation of cleaning the holder and, where the contents is siphoned out, for draining the bottom thereof. The pipe H' joins the pipe E² at its lower end, and this pipe may be provided with a sight glass E³ in order that the operator or inspector, under whose supervision the pasteurization is carried on, may be sure that no milk is being discharged through this pipe during the normal operation of the apparatus. The pipe E² is provided with a joint secured by a collar E⁴ and the pipe H' with a similar collar-secured joint H², in order that they may be removed for thorough cleansing and for transportation purposes.

The receptacle G is positioned and supported upon a cross-piece L secured to the walls of the holder and extending diametrically across the same. This receptacle is provided with an overflow pipe M, and this pipe may be used for the purpose of preventing an overflow from the said receptacle in case the operator fails to observe the influx of milk and regulate it so that the pipe J will not supply milk faster than it can escape through the neck G². This pipe M extends through the wall of the holder and may be arranged to discharge the milk overflowing through it into any suitable receptacle or to convey it back to the holder or the source of supply.

At times, instead of subjecting the milk to a moderate heat for a comparatively long period, it is desirable to subject it to a higher temperature for a shorter period. Thus, for instance, it is common practice to subject milk to a temperature of 150 degrees for thirty minutes or to a temperature of 160 degrees or more for fifteen minutes, and the period will vary in an inverse ratio of the temperature within prescribed limits. In the case last mentioned it is, of course desirable to have the holder so arranged that the milk entering it will be discharged therefrom after a shorter period, and I have therefore provided the branch pipe H⁵ about half-way between the bottom of the holder and the upper outlet. This branch pipe extends through the wall of the holder and communicates with the outside discharge pipe H'. It is also controlled by a valve H⁶, so that it can be closed when the upper outlet is used, and the outer portion of the pipe is made detachable by means of a joint secured by the collar H⁷.

In the construction shown in Fig. 1 the float is provided with a loop B⁴ by which it may be raised from the bottom of the holder and removed, if desired. In the construction shown in Fig. 3, a float-operated valve at the bottom of the holder is provided. This consists of a valve seat F', a plug F², the latter secured to the lower end of the valve rod F. The rod extends through a central aperture B' in the float and has a collar F³ above the said float. When the float rises to the predetermined point, its loop B² comes in contact with the collar F³ and raises the rod F, thus opening the valve at the bottom of the holder, and when it falls again with the fall of the liquid level, the rod is allowed to descend so that the outlet valve will be closed by the pressure of the liquid on the plug. The rod F extends up through the receptacle G, passing through its discharge neck G² which is centrally located therein, and, as the rod is thus firmly held in position, it is not necessary to use the centering arms D (Fig. 1) to space the float B through which the rod F extends, as the rod will hold the said float in its central position.

In the construction of Fig. 3 the capacity of the holder—and the consequent period of charge and discharge—may be varied at will by simply moving the collar F³ on the rod F up and down, and the said collar is provided with a set-screw F⁴ for this purpose. A certain regulation may also be accomplished by increasing or diminishing the rate of the supply of the milk through the pipe J, and as the outlet pipe has a greater capacity than the inlet pipe it will permit of a certain increase, above normal in the rate of supply, but the means of varying the period above described is more satisfactory and reliable, and does not necessarily involve any variation in the rate of supply.

The pipe H is provided at about mid-height with a branch pipe H⁵ made in two sections communicating with the outlet pipe H' and provided with a collar H⁷, connecting these two sections. It is also provided with a valve H⁶ by which it may be opened and closed. Through the use of this valve-controlled branch pipe the liquid may be discharged below the normal outlet when desired.

It will be seen from the foregoing description and from the accompanying drawings that the apparatus is extremely simple in construction, and that it may be dismembered and reassembled with little difficulty. These features are important, as it is advisable to thoroughly cleanse an apparatus of this character at frequent intervals.

It will be apparent that many of the details of construction herein described, and illustrated in the drawings, are unimportant and may be varied or omitted without departing from the spirit of the invention.

What I claim is:

1. In a device of the character described, the combination of a holder for liquid, a conduit adapted to discharge liquid into the upper part of the holder, an outlet channel adapted to permit the discharge of liquid from the lower part of the holder only, said outlet permitting the escape of liquid from the holder only when the level of liquid therein is above the lower part of said holder, and means for preventing liquid entering the holder from having vertical movement.

2. In a device of the character described, the combination of a holder for liquid, a conduit adapted to discharge liquid into the upper part of the holder, an outlet channel adapted to permit the discharge of liquid from the lower part of the holder only, said outlet permitting the escape of liquid from the holder only when the level of liquid therein is above the lower part of said holder, and means for preventing liquid entering the holder from having vertical movement, comprising a horizontal spreader arranged to rise and fall with and constantly occupy a position at the upper surface of the liquid and to receive the impact of the liquid before it reaches the body of liquid in the holder.

3. In a device of the character described, the combination of a holder for liquid, a conduit adapted to discharge liquid into the upper part of the holder, an outlet channel adapted to permit the discharge of liquid from the lower part of the holder only, said outlet permitting the escape of liquid from the holder only when the level of liquid therein is above the lower part of said holder, and means for preventing liquid entering the holder from having vertical movement, comprising a horizontal spreader arranged to rise and fall with and constantly occupy a position at the upper surface of the liquid and to receive the impact of the liquid before it reaches the body of liquid in the holder, and a receptacle between the discharge end of the supply conduit and the spreader adapted to receive liquid from said discharge end and discharge it upon the spreader, said receptacle being open at the top.

4. In a device of the character described, the combination of a holder for liquid, a conduit adapted to discharge liquid into the upper part of the holder, an outlet channel adapted to permit the discharge of liquid from the lower part of the holder only, said outlet permitting the escape of liquid from the holder only when the level of liquid therein is above the lower part of said holder, and means for preventing liquid entering the holder from having vertical movement, comprising a horizontal spreader arranged to rise and fall with and constantly occupy a position at the upper surface of the liquid and to receive the impact of the liquid before it reaches the body of liquid in the holder, the diameter of said spreader being less than the diameter of the holder so as to leave a space between it and the walls of said holder.

5. In a device of the character described, the combination of a holder for liquid, a conduit adapted to discharge liquid into the upper part of the holder, an outlet channel adapted to permit the discharge of liquid from the lower part of the holder only, said outlet permitting the escape of liquid from the holder only when the level of liquid therein is above the lower part of said holder, and means for preventing liquid entering the holder from having vertical movement, comprising a horizontal spreader arranged to rise and fall with and constantly occupy a position at the upper surface of the liquid and to receive the impact of the liquid before it reaches the body of liquid in the holder and a flange extending from the body of said spreader toward the walls of the holder.

6. In a device of the character described, the combination of a holder for liquid, a conduit adapted to discharge liquid into the upper part of the holder, an outlet channel adapted to permit the discharge of liquid from the lower part of the holder only, said outlet permitting the escape of liquid from the holder only when the level of liquid therein is above the lower part of said holder, and means for preventing liquid entering the holder from having vertical movement, comprising a horizontal spreader arranged to rise and fall with and constantly occupy a position at the upper surface of the liquid and to receive the impact of the liquid before it reaches the body of liquid in the holder and a flange extending from the body of said spreader toward the walls of the holder so located and arranged that it is normally below the upper surface of the liquid.

7. In a device of the character described, the combination of a holder for liquid, a conduit adapted to discharge liquid into the upper part of the holder, an outlet channel adapted to permit the discharge of liquid from the lower part of the holder only, said outlet permitting the escape of liquid from the holder only when the level of liquid therein is above the lower part of said holder, and means for preventing liquid entering the holder from having vertical movement, comprising a horizontal spreader arranged to rise and fall with and constantly occupy a position at the upper surface of the liquid and to receive the impact of the liquid before it reaches the body of liquid in the holder and an annular vertical flange surrounding the portion of the spreader which receives the impact of the liquid.

8. In a device of the character described, the combination of a holder for liquid, a conduit adapted to discharge liquid into the upper part of the holder, an outlet channel adapted to permit the discharge of liquid from the lower part of the holder only, said outlet permitting the escape of liquid from the holder only when the level of liquid therein is above the lower part of said holder, and means for preventing liquid entering the holder from having vertical movement, comprising a float adapted to rise and fall with the rise and fall of liquid in the holder and to intercept the liquid entering the holder before it reaches the body of liquid therein and cause it to spread horizontally.

9. In a device of the character described, the combination of a holder for liquid, a conduit adapted to discharge liquid into the upper part of the holder, an outlet channel adapted to permit the discharge of liquid from the lower part of the holder only, said outlet permitting the escape of liquid from the holder only when the level of liquid therein is above the lower part of said holder, and means for preventing liquid entering the holder from having vertical movement, comprising a float adapted to rise and fall with the rise and fall of liquid in the holder and to intercept the liquid entering the holder before it reaches the body of liquid therein and cause it to spread horizontally, a rod extending above and below said float, a valve with which one end of said rod is connected controlling the outlet of liquid from the holder, an enlargement on said rod at the upper part of the holder, the construction and arrangement being such that when the float in rising comes in contact with said enlargement the rod will be moved and caused to open the outlet valve.

10. A milk holding apparatus, comprising a milk holding vessel arranged intermediate a pasteurizer and a cooler, a milk receiver arranged in the upper portion of the said milk holding vessel and into which passes the milk from the pasteurizer, the said receiver discharging into the upper end of the said vessel, an outlet leading from the bottom of the said milk holding vessel for delivering the milk to the cooler, a valve controlling the said outlet, and a float controlling the said valve and floating on the milk in the holder.

11. A milk holding apparatus, comprising a milk holding vessel, a milk receiver in the upper portion of the said vessel and having a bottom outlet, and a milk spreader floating on the milk in the said vessel and rising and falling with the milk in the said vessel and onto the said milk spreader passes the milk from the said milk receiver to be spread by the said spreader and delivered to the level of the milk in the said vessel.

12. A milk holding apparatus, comprising a milk holding vessel, a milk receiver in the upper end of the vessel for receiving the milk from a pasteurizer and discharging it into the upper end of the vessel, an outlet leading from the bottom of the vessel, a valve in the said outlet, and a float in the vessel and connected with the said valve, the said float forming a spreader for the milk discharged from the said receiver.

13. A milk holding apparatus, comprising a milk holding vessel, a milk receiver in the upper end of the vessel for receiving the milk from a pasteurizer and discharging it into the upper end of the vessel, a float-controlled outlet at the bottom of the vessel for delivering the milk to a cooler, and an overflow leading from the said receiver to return surplus milk to the pasteurizer.

Witness my hand this 30th day of June, 1910, at the city of New York, in the county and State of New York.

WILLIAM H. PARK.

Witnesses:
 S. J. Cox,
 ALAN C. McDONNELL.